(12) United States Patent
Bengtsson et al.

(10) Patent No.: US 6,480,924 B1
(45) Date of Patent: Nov. 12, 2002

(54) APPLICATION SPECIFIC INTEGRATED CIRCUIT AND TRANSCEIVER WITH MULTI-MODE CONNECTION

(75) Inventors: Jan Bengtsson; Kenny Ranerup, both of Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 09/287,360

(22) Filed: Apr. 7, 1999

(30) Foreign Application Priority Data

May 13, 1998 (SE) ............................................. 9801674

(51) Int. Cl.$^7$ ................................................ G06F 1/00
(52) U.S. Cl. ...................... 710/306; 710/305; 710/63; 710/72
(58) Field of Search ................. 710/126–129, 710/62, 63–65, 72–73, 305, 306, 311

(56) References Cited

U.S. PATENT DOCUMENTS

| | | | | |
|---|---|---|---|---|
| 5,727,184 A | * | 3/1998 | Richter et al. ............... | 395/500 |
| 5,905,885 A | * | 5/1999 | Richter et al. ............... | 395/500 |
| 5,915,207 A | * | 6/1999 | Dao et al. ...................... | 455/9 |
| 6,064,649 A | * | 5/2000 | Johnston ...................... | 370/232 |

FOREIGN PATENT DOCUMENTS

| | | |
|---|---|---|
| EP | 0664514 A1 | 7/1995 |
| WO | 96 26489 | 8/1996 |

OTHER PUBLICATIONS

Sassan Teymouri et al., Computer Technology Review, vol. XVII, No. 11, Nov. 1997 pp. 525–528 John Novellino, Electronic Design, vol. 59, Jan. 1994.

\* cited by examiner

*Primary Examiner*—Peter Wong
*Assistant Examiner*—Raymond N Phan
(74) *Attorney, Agent, or Firm*—Cary & Kelly, LLP; Charles C. Cary

(57) ABSTRACT

The present invention relates to an application specific integrated circuit (ASIC) comprising an integrated central processor unit (CPU) (10), an integrated network interface control (NIC) (11) and at least one integrated input/output (I/O) device (13–16), and a transceiver circuit for buffering and amplifying SCSI signals from such an ASIC, whereby the outputs can be enabled to function as totem-pole or open-drain outputs, for active negation and wired-OR, respectively.

According to the invention at least one I/O device is an ATA (16) or SCSI (15) device, with ports for connection to an external transceiver.

The invention also relates to such a transceiver circuit for buffering and amplifying SCSI signals on single direction lines from an ASIC, whereby the outputs to the SCSI bus can be enabled to function as totem-pole or open-drain outputs, for active negation and wired-OR, respectively. In this circuit the same data transmission lines between the transceiver circuit and the ASIC is used for wired-OR and for active negation.

8 Claims, 7 Drawing Sheets

APPLICATION SPECIFIC INTEGRATED CIRCUIT AND TRANSCEIVER WITH MULTI-MODE CONNECTION

FIELD OF THE INVENTION

The present invention relates to an application specific integrated circuit (ASIC) comprising an integrated central processor unit (CPU) (10), an integrated network interface control (NIC) (11) and at least one integrated input/output (I/O) device (13–16), and a transceiver circuit for buffering and amplifying SCSI signals from such an ASIC, whereby the outputs can be enabled to function as totem-pole or open-drain outputs, for active negation and wired-OR, respectively.

BACKGROUND OF THE INVENTION

Application specific integrated circuits (ASIC) for connection between a data communication network and peripheral devices traditionally comprises a central processor unit (CPU), a network interface control (NIC) and input/output (I/O) means. These I/O means are conventionally parallel or serial I/O devices. However there is a need for faster communication and the possibility to use faster communication protocols. This is especially important when the ASIC are intended for control and management of non-PC type peripherals, to make them act as independent servers on a network. There is for such ASIC's a wish for faster communication protocols to make them cost effective.

Such faster communication protocols could be SCSI or ATA. However, these communication protocols have, never to the applicant's knowledge, been used in ASIC's of the above mentioned type.

The SCSI protocol is designed to provide a peer-to-peer I/O bus for data transfer with peripheral devices, such as magnetic discs, tapes, printers, processors, optical discs, magnetic tapes, CD-ROMs, scanners, medium changers, and communications devices. The SCSI-standards are described in ANSI X3.131-1994: Small Computer Systems Interface-2 (SCSI-2) and ANSI X3.277-1996: Information Technology—SCSI-3 Fast-20.

Attention Attachment (ATA) is an interface protocol mainly used for memory devices, and is also called Integrated Device Electronics (IDE), and is specified in ANSI X3.279-1996: AT Attachment Interface with Extensions (ATA-2).

These communication protocols have mainly been used for personal computers and the like, and mostly with integrated transceiver circuits, where the CPU, SCSI, NIC etc. are separate circuits. This is however not applicable for smaller devices, due to the extensive increase in the production cost. For such smaller devices it is instead convenient to use external transceiver circuits for buffering and amplifying the signals. Another reason to use such external transceiver circuits is that the device becomes more portable and compatible. The device hereby does not become dependent on certain protocols, such as SCSI, but can be transferred between different technologies. Still another reason is that the signal level and power that is needed for SCSI would make it necessary to use two different modes for the pins, e.g. for ATA, if the transceiver circuit was integrated. If, however, an external transceiver circuit is used, the same signal levels can be used independently of the intended use of the device, and whereto the pins are to be connected.

A problem for such transceiver circuits is, that it has to be able to handle both the case with wired-OR and the case with active negation. In wired-OR the signal is actively driven to a low position, but is left to return to the high position without active driving. To speed up the speed of the data transfer it is possible to actively return the level to high. This is called active negation. For example with the use of SCSI it is necessary to use both wired-OR and active negation; wired-OR has to be used at least during the arbitration phase while it is preferred to use the faster active negation in the information transfer phase. It is also necessary to be able to change the direction of the bus.

A known transceiver circuit which is able to handle both the wired-OR and the active negation situation is for example the transceiver circuit SN75LBC968 from Texas Instruments. This circuit is intended to be, at one side, connected with single direction lines to an application circuit, and at the other side to double direction SCSI bus lines. However, a disadvantage with this circuit is that it uses separate pins for the connection with an application circuit for active negation transfer and for wired-OR transfer, i.e. some outputs are totem-poles and some are open-drains. This means that there is a need for twice as many data bus pins on the application circuit. There is therefore a wish for transceiver circuits and ASIC's that uses fewer connection points, and thereby can be made easier and cheaper.

SUMMARY OF THE INVENTION

It is therefore an object of the present invention to provide an ASIC and a transceiver circuit of the above mentioned type which are cheaper and easier to produce, and that preferably can be connected to one another with fewer connections.

This object is achieved with an ASIC and a transceiver circuit according to the appended claims.

According to one aspect of the invention the object is achieved with an application specific integrated circuit (ASIC) comprising an integrated central processor unit (CPU) (10), an integrated network interface control (NIC) (11) and at least one integrated input/output (I/O) device (13–16), whereby one of the at least one I/O device is an ATA (16) or SCSI (15) device, with ports for connection to an external transceiver. Hereby it is possible to use the ATA and/or the SCSI protocol for faster communication between the ASIC and peripheral devices.

The integration of SCSI and/or ATA on an ASIC together with at least CPU and NIC provides several advantages relative to the prior art. E.g. it lowers the manufacturing cost of the circuit, the performance characteristics are improved, and the power consumption of the circuit is decreased as well as the EMI (Electro magnetic interference).

Preferably the NIC (11) is a fast ethernet interface. Hereby, it is also possible with faster network communication to and from the ASIC.

Further, the ASIC, with SCSI, preferably comprises pins for communication input and output, and whereby the same data pins are used for wired-OR and for active negation, and whereby one of the additional signals, and preferably the busy-signal, is used to drive the SCSI ID-signal during arbitration. Hereby, a construction which uses significantly fewer output and input pins are possible, which makes the ASIC easier and cheaper to produce.

To be able to communicate with peripheral devices with a SCSI bus, the ASIC need to have a SCSI unit, and there is also a need for an external transceiver unit between the SCSI bus and the ASIC.

Therefore, the invention also comprises, according to a second aspect, a transceiver circuit for buffering and amplifying SCSI signals from an ASIC of the previously described type, whereby the outputs can be enabled to function as totem-pole or open-drain outputs, for active negation and wired-OR, respectively, and whereby the same data transmission lines between the transceiver circuit and the application circuit is used for wired-OR and for active negation. Preferably the BSY-signal, during the arbitration phase, also is used to drive the SCSI ID-signal on the data bus. Hereby the need for communication lines between the ASIC and the transceiver is diminished which provides for an easier and more cost effective solution.

SHORT DESCRIPTION OF THE DRAWINGS

For exemplifying purposes, the invention will be described in closer detail in the following with reference to embodiments thereof illustrated in the attached drawings, wherein.

BRIEF DESCRIPTION OF THE SCSI-PROTOCOL

Figure 1:
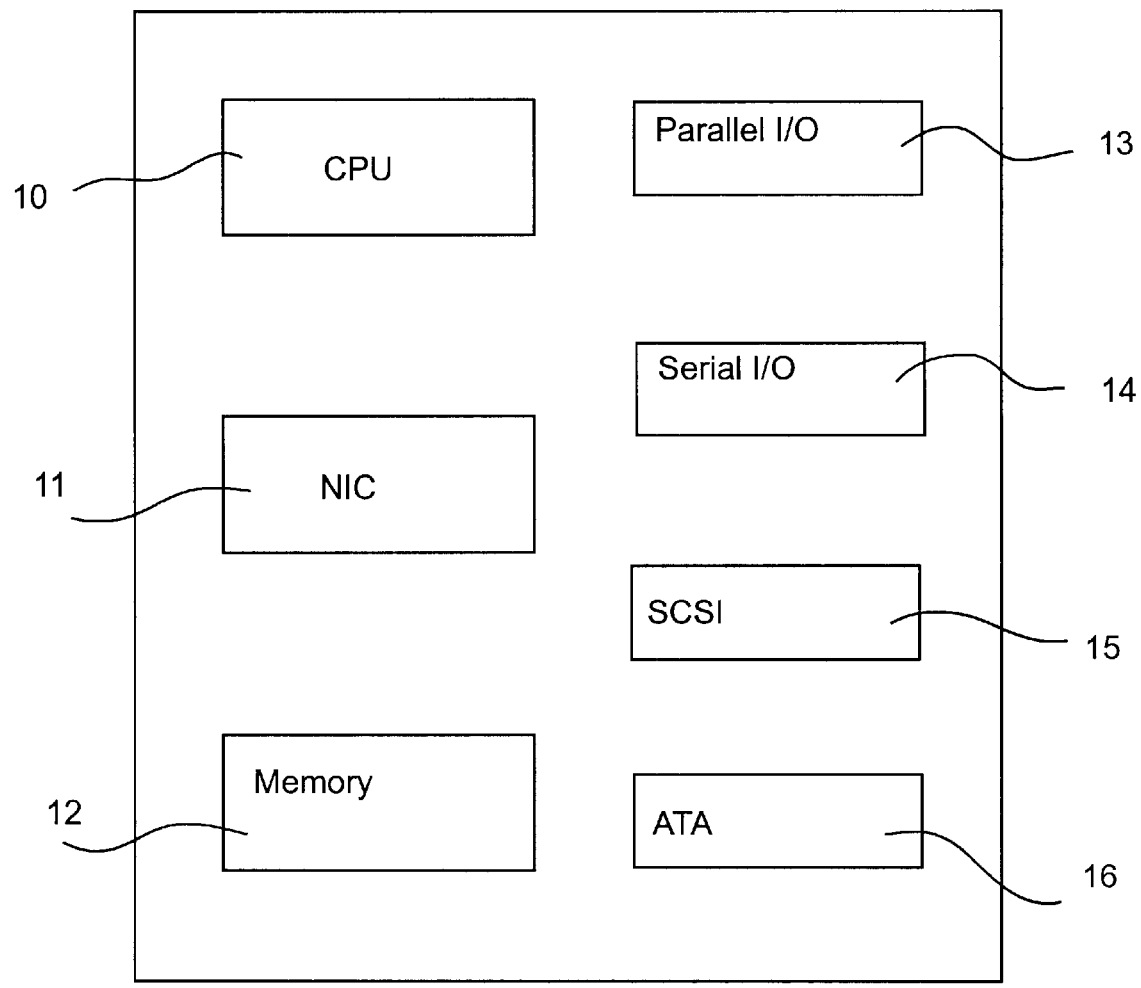
FIG. 1 is a diagram, schematically illustrating an ASIC according to the invention.

The SCSI interface protocol provides for the connection of multiple initiators (SCSI devices capable of initiating an operation) and multiple targets (SCSI devices capable of responding to a request to perform an operation). A priority system, arbitration, awards interface control to the highest priority SCSI device that is contending for use of the bus.

The SCSI architecture includes the following distinct phases: BUS FREE phase, ARBITRATION phase, SELECTION phase, RESELECTION phase, COMMAND phase, DATA phase, STATUS phase, and MESSAGE phase, where the four last mentioned phases collectively are termed the information transfer phases. The SCSI bus can never be in more than one phase at any given time.

The BUS FREE phase indicates that there is no current I/O process and that the SCSI bus is available for a connection. SCSI devices shall detect the BUS FREE phase after the SEL and BSY signals are both false for at least a bus settle delay.

The ARBITRATION phase is defined to permit multiple initiators and to permit concurrent I/O operations and allows one SCSI device to gain control of the SCSI bus so that it can initiate or resume an I/O process. The procedure for an SCSI device to obtain control of the SCSI bus is as follows:

The SCSI device shall first wait for the BUS FREE phase to occur.

Next, the SCSI device may arbitrate for the SCSI bus by asserting both the BSY signal and its own SCSI ID, i.e. the bit-significant representation of the SCSI address referring to one of the signal lines DB(7-0).

Then the SCSI device shall examine the DATA BUS. If a higher priority SCSI ID bit is true on the DATA BUS (DB(7) is the highest), then the SCSI device has lost the arbitration and the SCSI device may release its signals and return to the first step. If no higher priority SCSI ID bit is true on the DATA BUS, then the SCSI device has won the arbitration and it shall assert the SEL signal. Any SCSI device other than the winner has lost the arbitration and shall release the BSY signal and its SCSI ID bit. An SCSI device that loses arbitration may return to the first step.

The SELECTION phase allows an initiator to select a target for the purpose of initiating some target function (e.g. READ or WRITE command). The SCSI device that won the arbitration has both the BSY and SEL signals asserted and becomes an initiator by not asserting the I/O signal. The initiator shall assert the ATN signal (indicating that a MESSAGE OUT phase is to follow the SELECTION phase).

The target shall determine that it is selected when the SEL signal and its SCSI ID bit are true and the BSY and I/O signals are false. The selected target may examine the DATA BUS in order to determine the SCSI ID of the selecting initiator. The selected target shall then assert the BSY signal.

The COMMAND, DATA, STATUS, and MESSAGE phases are all grouped together as the information transfer phases because they are all used to transfer data or control information via the DATA BUS. The actual operation of information transfer is beyond the scope of this application.

The C/D, I/O, and MSG signals are used to distinguish between the different information transfer phases. The target drives these three signals and therefore controls all changes from one phase to another. The initiator can request a MESSAGE OUT phase by asserting the ATN signal, while the target can cause the BUS FREE phase by releasing the SEL and BSY signals.

The information transfer phases use one or more REQ/ACK handshakes to control the information transfer. Each REQ/ACK handshake allows the transfer of one byte of information. During the information transfer phases the BSY signal shall remain true and the SEL signal shall remain false.

Wide data transfer is optional and may be used in the DATA phase. Wide data transfers of 16- or 32-bits may be established. All SCSI devices shall support 8-bit data transfers.

During a 16-bit wide data transfers, the first logical data byte for each data phase shall be transferred across the DB(7-0,P) signals on the A cable and the second logical data byte shall be transferred across the DB(15-8,P1) signals on the B cable. Subsequent pairs of data bytes are likewise transferred in parallel across the A and B cables. However, most SCSI users today use the P and Q cables. The P cable is used for 8-bit and 16-bit wide transfer, and the Q cable is used for transferring bits 31–16 during a 32-bit wide transfer. For 8-bit wide data transfer all bytes are transferred on DB(7-0,P) in the P cable. For 16-bit wide data transfers, logical byte 0 is transferred on DB(7-0,P), and logical byte 0 and 1 are transferred in the P cable as before and logical byte 2 is transferred on DB(23-16,P2) in the Q cable, and logical byte 3 is transferred on DB(31-24,P3) in the Q-cable.

The normal progression is from the BUS FREE phase to ARBITRATION, from ARBITRATION to SELECTION or RESELECTION, and from SELECTION or RESELECTION to one or more of the information transfer phases (COMMAND, DATA, STATUS, or MESSAGE). The final information transfer phase is normally the MESSAGE IN phase where a DISCONNECT, or COMMAND COMPLETE message is transferred, followed by the BUS FREE phase.

DESCRIPTION OF PREFERRED EMBODIMENTS

Referring to FIG. 1, an application specific integrated circuit (ASIC) according to the present invention comprises an integrated central processor unit (CPU) 10, a network interface control (NIC) 11 and integrated input/output (I/O) devices 13-16. Optionally the circuit can comprise integrated memory means 12. The memory 12 is preferably a flash, DRAM or SRAM memory, and is used for storing programs and data. However, it could as well be a cache memory for the CPU. The NIC 11 controls the communication between the ASIC and a network. Preferably the NIC supports fast communication such as Fast Ethernet (IEEE Standard 802.3u-1995).

Figure 2:
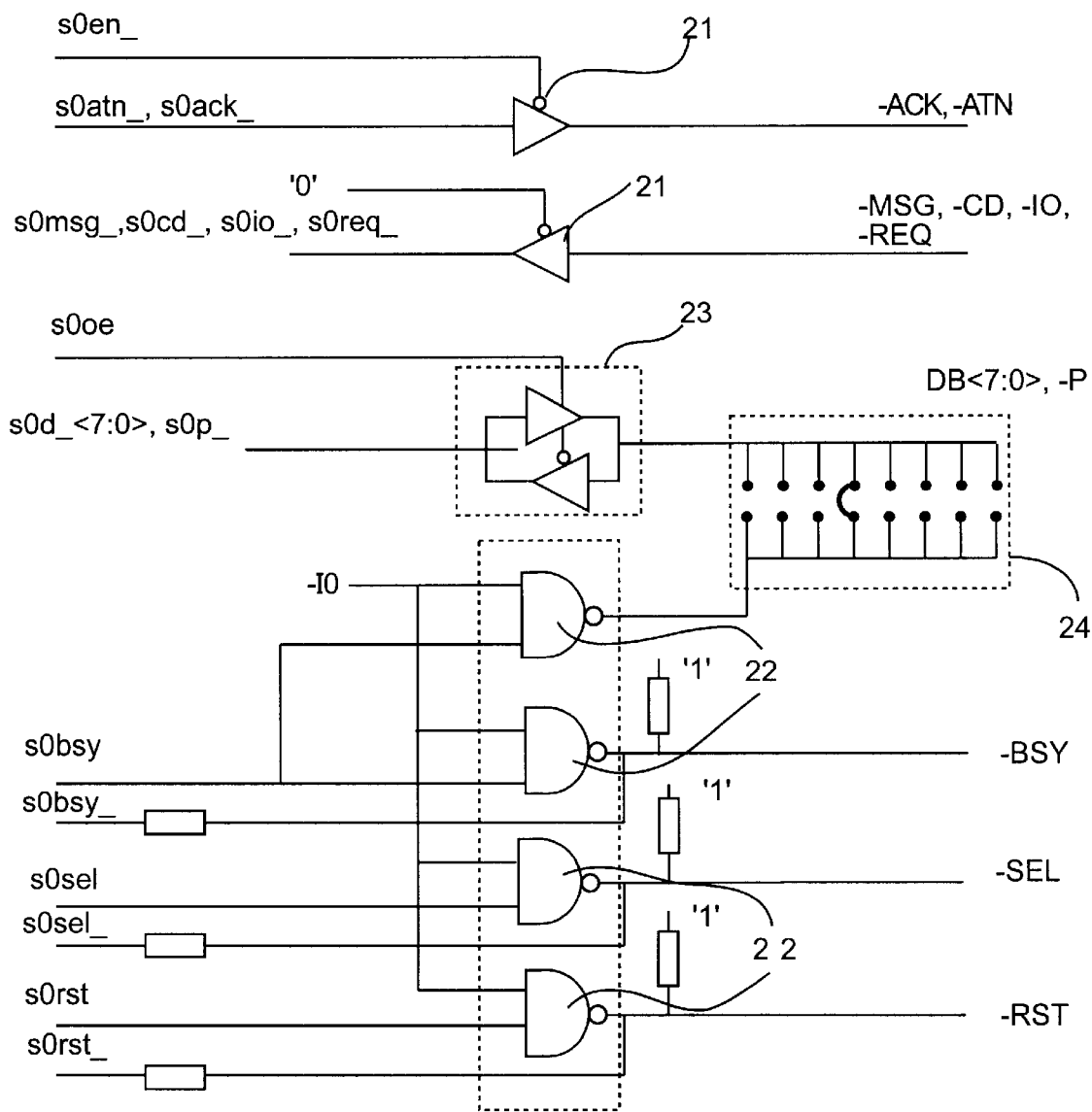
FIG. 2 is a circuit diagram of a first embodiment of a transceiver circuit according to the invention.

The I/O devices can comprise conventional parallel and serial I/O 13, 14, but should according to the present invention at least comprise I/O devices 15, 16 supporting the faster I/O protocols SCSI or/and ATA. The I/O devices are of the type with pins for connection to a transceiver circuit. If parallel and serial I/O is needed depends on the purpose of the ASIC, i.e. for which application it is intended. SCSI and ATA are normally exchangeable, i.e. could be used in the same kind of products. However, SCSI is particularly useful for scanner applications. A transceiver circuit according to the invention is illustrated in FIG. 2. The circuit is intended to be, at one side, connected with lines to an ASIC, and at the other side to double direction SCSI bus lines. The MSG, CD, IO and REQ signals are received and driven as in conventional transceiver circuits through amplifiers 21. The ACK and ATN signals can operate in an open collector state (high-impedance state), as well as an active negation state, depending on the control signals from the ASIC. The BSY, SEL and RST signals are driven and received with an input and output connection from the ASIC. The output signals are driven through open collector NAND-gates 22. The data bus (DB) signals are driven through a bus transceiver 23, whereby an extra signal S0oe is used to control the direction of the transmission. In this embodiment there are eight data bits DB0-DB7 and one parity bit P, used for the data transfer, which for the case of active negation are connected to input and output ports at the ASIC. However, each of the DB(7-0,P) signals on the SCSI bus are only connected to one pin on the ASIC.

In the arbitration phase, when wired-OR is used, the BSY signal on the SCSI bus is at first set to true by setting s0bsy from the ASIC to true. Setting s0bsy to true also enables the ID-setting means and make it drive the ID onto DB(7-0). The ID-setting means always use wired-OR driving. At the same time the s0oe signal is false, making the transceiver 23 drive signals from the SCSI bus, DB(7-0,P), to the ASIC.

At the start of the pre-selection phase the ASIC examines DB(7-0) to decide if it won the arbitration or not. If it won the arbitration the ASIC set s0sel to true, and setting s0sel to true sets SEL to true on the SCSI bus, to signal to all other devices on the SCSI bus that they have lost arbitration and shall release all signals on the SCSI bus.

Thereafter the direction of the bus is turned. At the start of the DB turn-around all other devices on the SCSI bus have released all signals. At the same time the ASIC sets s0oe to true and the transceiver 23 starts driving the ID onto DB(7-0). The DB(7-0) is at this time driven both by the transceiver 23 and the ID-setting means, but they drive the same value, and thus there will be no conflicts. The s0en__ is also set to true making the driver 21 actively driving ATN to true.

At the start of the selection phase the s0bsy signal is set to false to set the BSY signal on the SCSI bus to false, and to disable the ID-setting means. The DB(7-0) signals are from now on only driven by the transceiver 23.

The ID-setting means is in one embodiment of the invention a mechanical strap placed so that it connects the BSY signal with one of the outgoing lines on the data bus, and hereby provides a fixed ID for the circuit.

Figure 3:
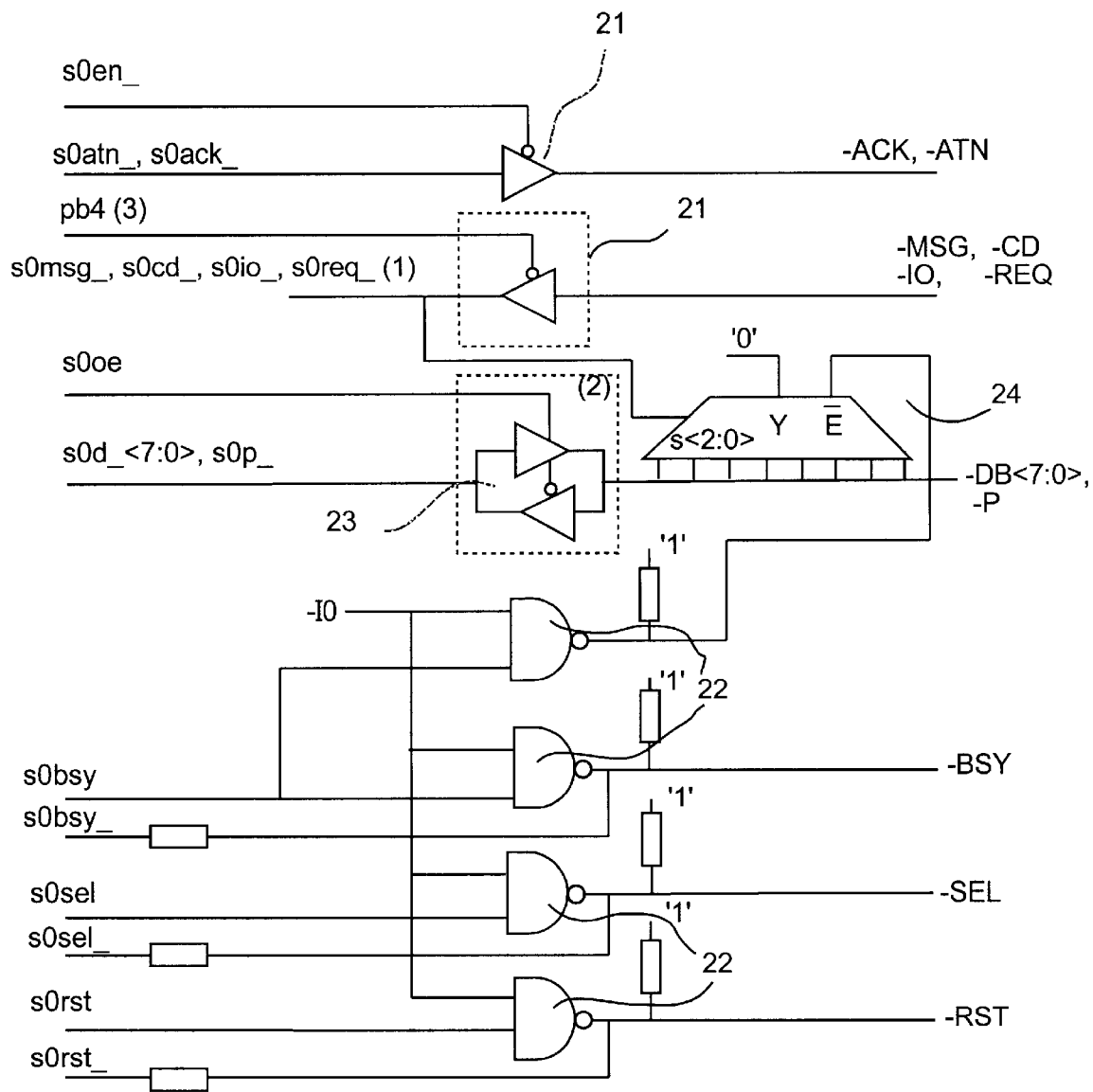
FIG. 3 is a circuit diagram of a second embodiment of a transceiver circuit according to the invention.

In FIG. 3 an alternative embodiment is shown. In this embodiment the ID-setting means 24 is software controlled. Here, the ID-setting means comprises a 3–8 decoder transmission gate, here driven with 0 V. The ID is hereby set by the MSG, CD and I/O signals, and an extra signal, PB4, to decide that the device is about to drive out the ID. The ID is preferably set by software and is stored in a internal register on the circuit. The ID signals are driven to the pins by the SCSI controller. The ID is preferably not set during manufacturing of the circuit. Instead a default ID is set at first, and stored in an external memory. Thereafter it is possible to change the ID through the network by means of software in the product.

The above-mentioned solution minimizes the needed number of signals to the circuit, and uses signals that at the time has no other intended use. Apart from the ID-setting means, the circuit in this embodiment is similar to the one described previously.

Figure 4:
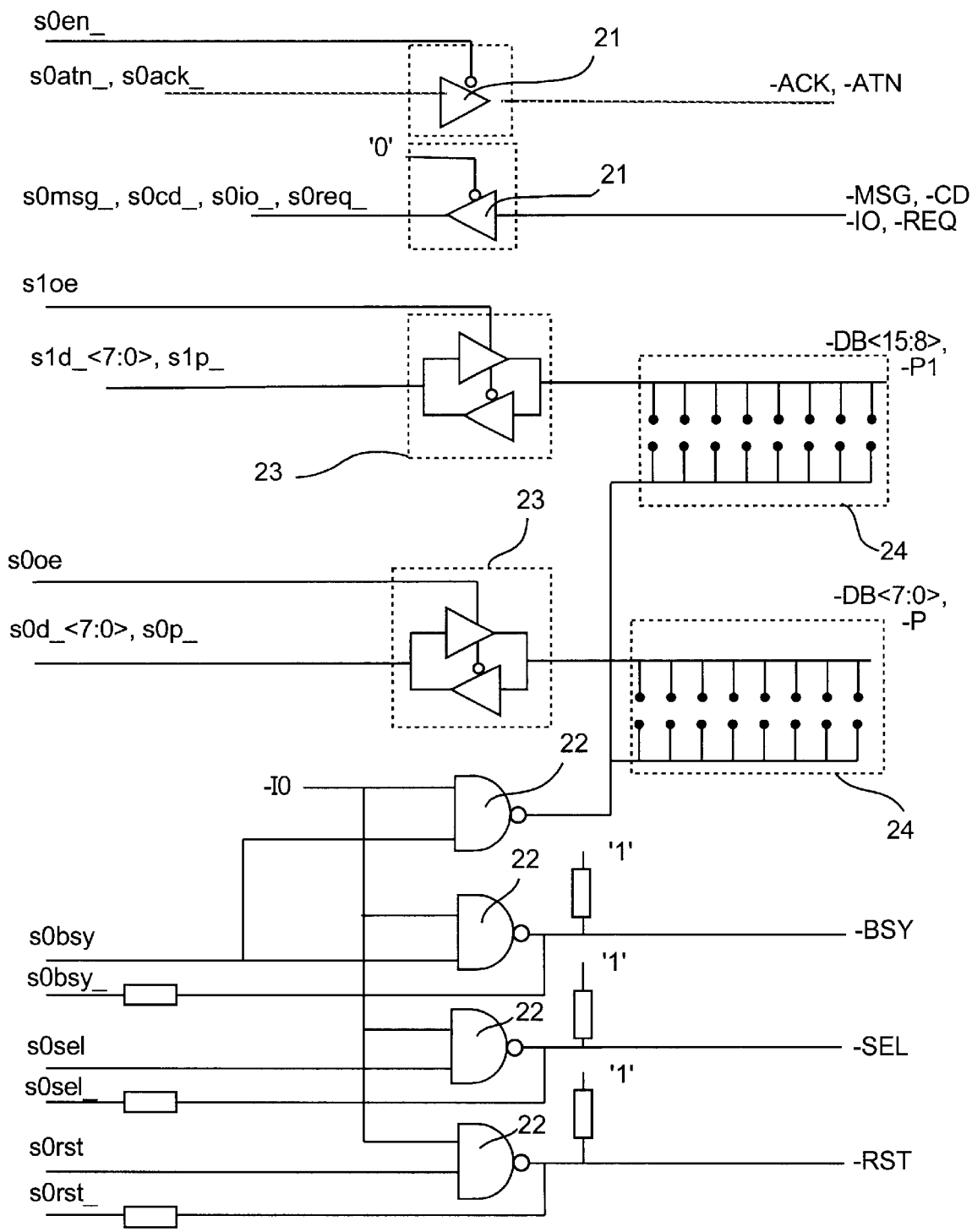
FIG. 4 is a circuit diagram of a third embodiment of a transceiver circuit according to the invention.

In FIG. 4 a third embodiment of the transceiver circuit according to the invention is shown. In this embodiment a 16-bit SCSI is used. For this situation the number of data signal lines are doubled, and likewise there are two sets of ID-setting means. The ID-setting means used in this embodiment is of the mechanical, hardware type described in the first embodiment.

Figure 5:
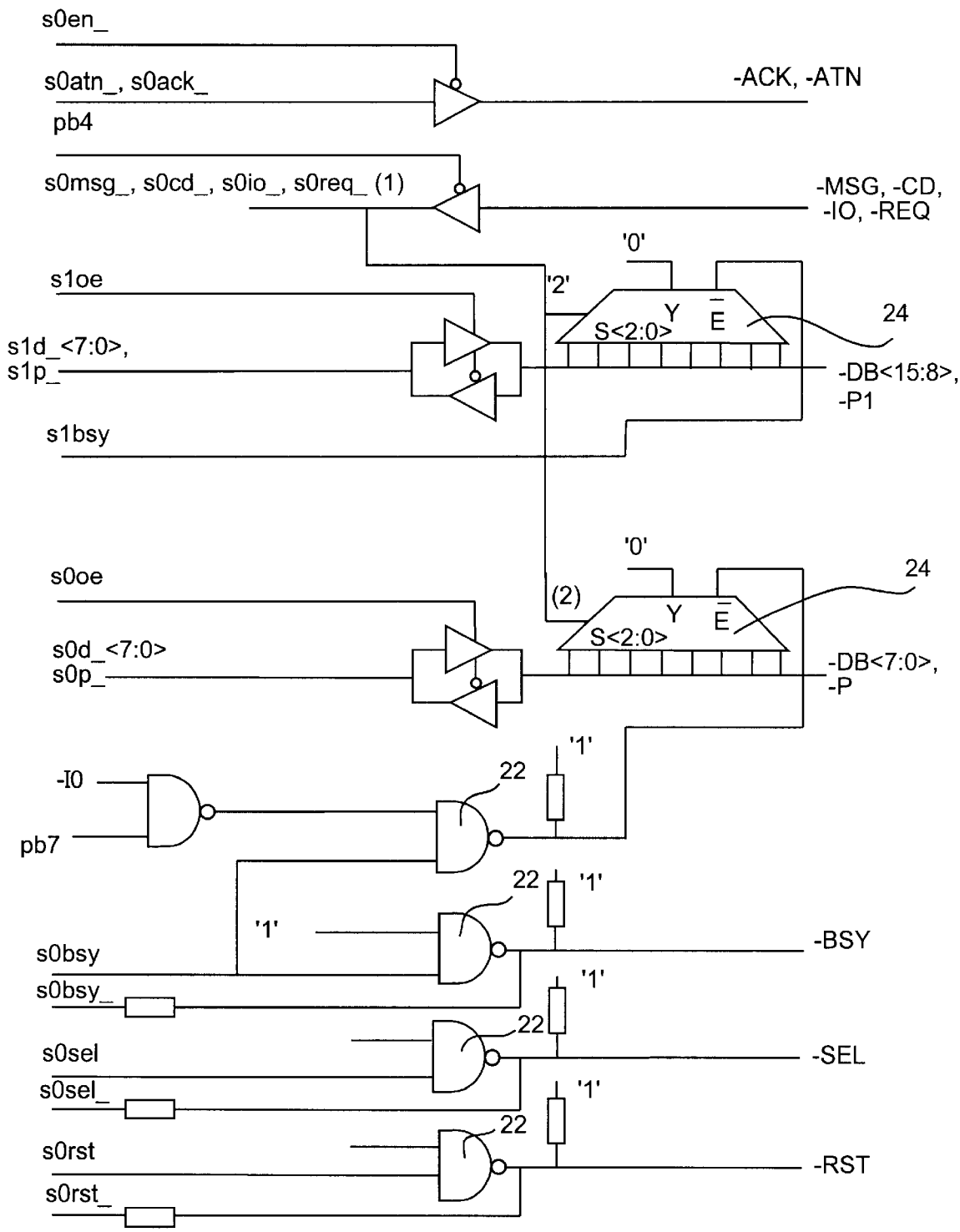
FIG. 5 is a circuit diagram of a fourth embodiment of a transceiver circuit according to the invention.

In FIG. 5 a fourth embodiment is illustrated. The difference between the third and fourth embodiment is that in the fourth embodiment software controlled ID-setting means, similar to that described in the second embodiment, is used. In this embodiment, the signals Pb7 and s1bsy are set depending on in which part of the bus the ID are to be driven.

The transceiver circuit can easily be made of commercially available standard components, and is hence easy and cheap to manufacture.

Figure 6:
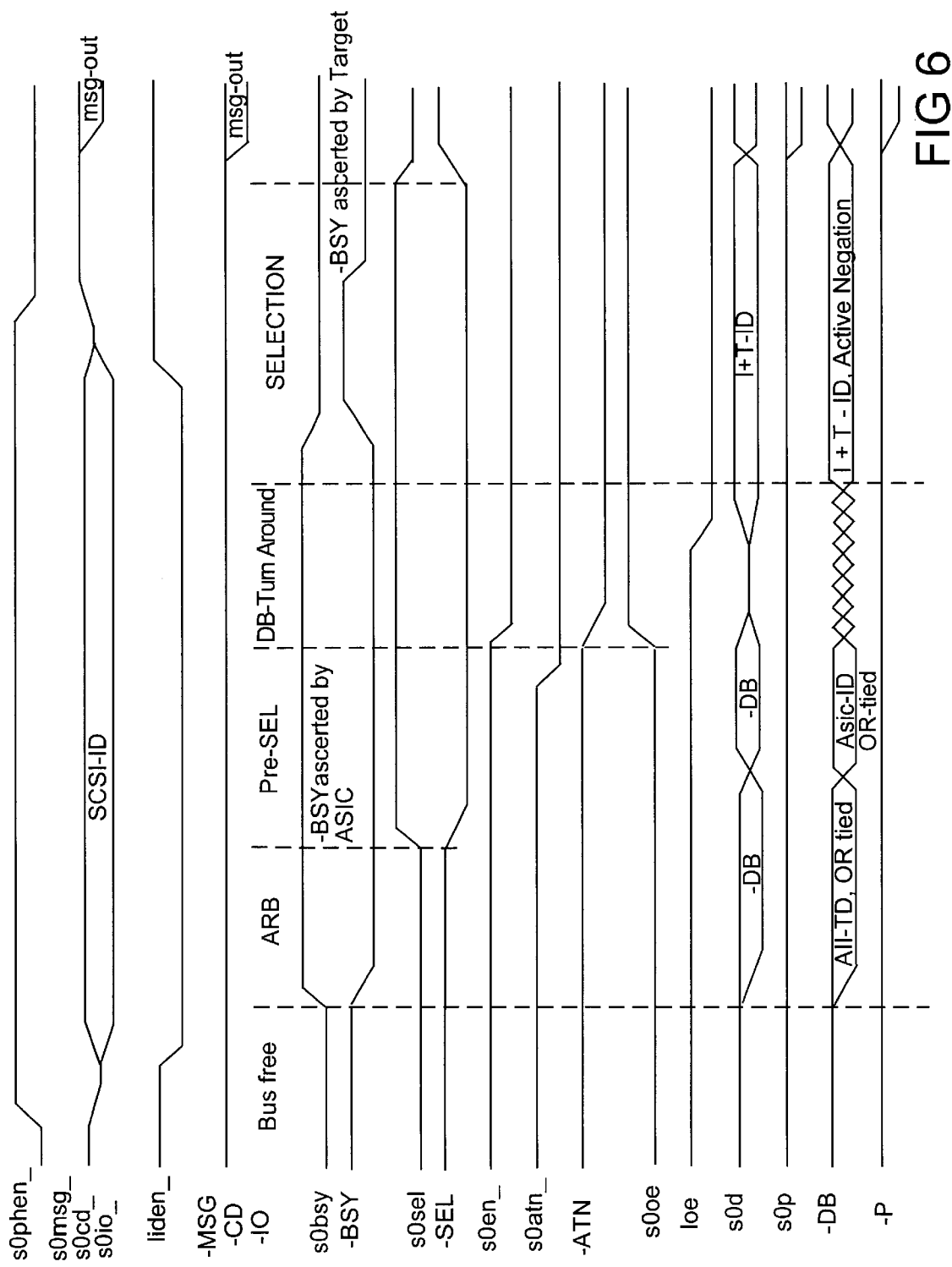
FIG. 6 is a timing diagram illustrating the different signals during different phases of the SCSI-protocol.

In FIG. 6 an example of the signal values during different phases are illustrated in a timing diagram. At first, at the left end of the diagram, the SCSI is in the BUS FREE phase and the SCSI bus is available for a connection. In this phase the SEL and BSY signals are both false. This is accomplished by the s0sel and s0bsy both being low. Thereafter, in the ARBITRATION phase the SCSI device arbitrates by asserting both the BSY signal and its own SCSI ID on the signal lines DB(7-0). The BSY signal is asserted by changing the s0bsy to a logical high, and the SCSI ID is set by the signals s0msg, s0cd, __s0io and pb4, in the case of the embodiment shown in FIG. 3.

If no higher priority SCSI ID bit is true on the DATA BUS, then the SCSI device has won the arbitration and it asserts the SEL signal, in a pre-selection phase, by changing the s0sel to a logic high.

The SELECTION phase allows an initiator to select a target. The SCSI device has both the BSY and SEL signals asserted and becomes an initiator by not asserting the I/O signal. The initiator shall assert the ATN signal, by setting s0atn__ to a logic low, (indicating that a MESSAGE OUT phase is to follow the SELECTION phase).

The target shall determine that it is selected when the SEL signal and its SCSI ID bit are true and the BSY and I/O signals are false. The selected target may examine the DATA BUS in order to determine the SCSI ID of the selecting initiator. The selected target shall then assert the BSY signal. The C/D, I/O, and MSG signals are used to distinguish between the different information transfer phases. The target drives these three signals and therefore controls all changes from one phase to another.

The –IO signal on the SCSI bus is preferably connected to the NAND-gate 22 to disable the ID-setting means at reselection. At reselection the initiator drives the BSY signal to true for a short while when it responds to a reselection from a target. At this time the target is driving the DB(7-0,P) signals, i.e. the ID-setting means must be disabled to avoid conflicts on the DB(7-0,P) signals. This is done by only enabling the ID-setting means when the I/O signal is false. At arbitration the I/O signal is false, and at reselection the I/O signal is true. These are the only two times the ID-setting means is enabled by the s0bsy signal.

With an ASIC and a transceiver circuit according to the invention, the same single direction data lines between the ASIC and the transceiver circuit can be used for both the wired-OR case during the arbitration and the active negation case during information transfer. In this way the number of lines, and hence the number of output and input pins on the ASIC and the transceiver circuit is diminished.

Figure 7:
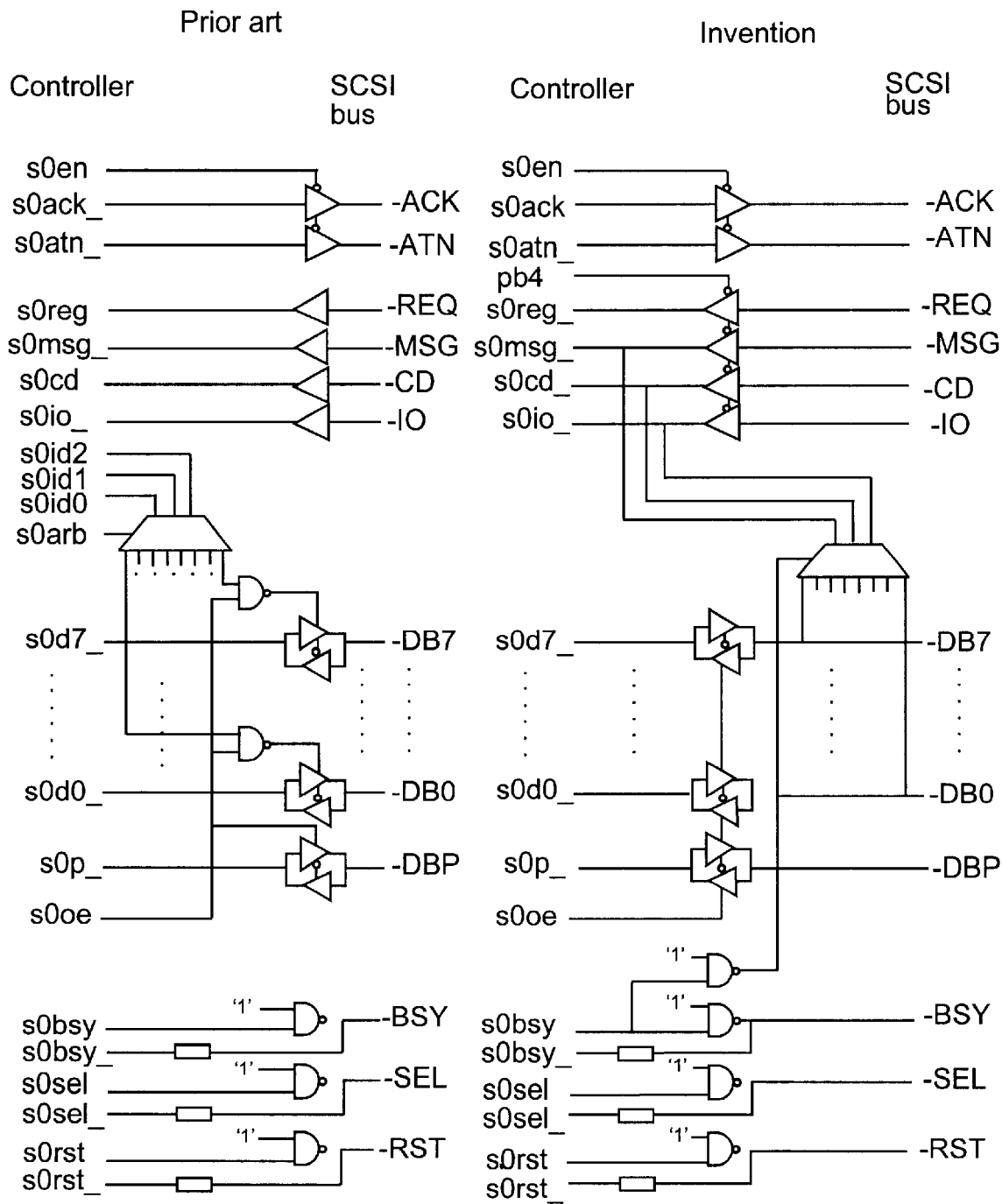
FIG. 7 is a schematic circuit diagram of the second embodiment of the transceiver circuit invention and a schematic circuit diagram of a previously known transceiver circuit.

Finally, a comparison between the second embodiment of the transceiver circuit according to the invention and a previously known transceiver circuit, e.g. SN75LBC968 from Texas Instruments, is made, with reference to FIG. 7. As can be readily seen, the circuit according to the invention uses the signal s0bsy to control the arbitration decoder, whereby the additional signal s0arb, used in the prior art, is eliminated. Further, the circuit according to the invention uses s0msg__, s0cd_ and s0io_ to select ID, and hereby the three additional control signals s0id2, s0id1 and s0id0, used in the prior art, can be eliminated. However, this requires the additional enable signal pb4 in the circuit according to the invention. Thus, three signals between the ASIC and the transceiver circuit can be eliminated by using the circuit according to the present invention.

By using the above-mentioned method to drive arbitration ID onto the bus through a open collector decoder, it is also possible to use the same direction control signals for all data bus transceivers. This makes it possible to find cheap standard circuits. The prior art solution does not have this advantage.

What is claimed is:

1. An application specific integrated circuit (ASIC) comprising:
    an integrated central-processor unit (CPU);
    an integrated network interface control (NIC); and
    at least one integrated SCSI input/output (I/O) device with a port with single direction pins for coupling to an external transceiver and with the same pins used for wired-OR and for active negation.

2. An ASIC according to claim 1, whereby a signal, and preferably a busy-signal from the ASIC, is used to drive a SCSI ID-signal during arbitration.

3. An ASIC according to claim 2, further comprising
    a memory storing the ID, wherein at least one conventional control signal are used to select the ID, enabled by an additional enable signal.

4. A transceiver for coupling a SCSI bus to an ASIC with a processor, a network interface and a SCSI input output (I/O) device with a port with single direction communication lines, and the transceiver comprising:
    a circuit for buffering and amplifying SCSI signals on the single direction communication lines from the SCSI I/O device, and the circuit with connections configured to couple to the SCSI bus and with the circuit connections enabled to function as totem-pole or open-drain outputs, for active negation and wired-OR, respectively, wherein the same communication lines between the transceiver circuit and the SCSI I/O device are used for wired-OR and for active negation.

5. A transceiver according to claim 4, characterized in that a busy-signal from the ASIC (s0bsy) during an arbitration phase drives SCSI ID-signal on the SCSI bus.

6. A transceiver according to claim 5, whereby the SCSI ID-signal is driven through at least one mechanical strap connecting the busy-signal from the ASIC (s0bsy) with the SCSI bus.

7. A transceiver according to claim 5, whereby the SCSI ID-signal is driven through a software controlled means connecting the busy-signal from the ASIC (s0bsy) with the SCSI bus.

8. A transceiver according to claim 7, whereby the software controlled means is at least one 3–8 decoder transmission gate.

* * * * *